United States Patent [19]

Hashimoto

[11] 4,151,654
[45] May 1, 1979

[54] DEVICE FOR MEASURING AXIALLY SYMMETRIC ASPHERICS

[75] Inventor: Hiroshi Hashimoto, Tokyo, Japan

[73] Assignee: Nippon Kogaku K.K., Tokyo, Japan

[21] Appl. No.: 872,033

[22] Filed: Jan. 24, 1978

[30] Foreign Application Priority Data

Jan. 27, 1977 [JP] Japan .................................. 52/7230

[51] Int. Cl.² .............................................. G01B 7/28
[52] U.S. Cl. .................................................... 33/174 P
[58] Field of Search ............ 33/174 R, 174 A, 174 P,
33/172 R, 172 E, 178 E, 178 R, DIG. 17

[56] References Cited

U.S. PATENT DOCUMENTS

| 965,211 | 7/1910 | Moe | 33/172 R |
|---|---|---|---|
| 3,481,043 | 12/1969 | Esch | 33/174 P |

*Primary Examiner*—Harry N. Haroian
*Attorney, Agent, or Firm*—Shapiro and Shapiro

[57] ABSTRACT

In a device for measuring axially symmetric aspherics which has means for mounting the aspherics thereon and means having an axis of rotation orthogonal to the axis of symmetry of the aspherics and passing through the center of curvature of the approximately tangential spherical plane of the aspherics, the means being for swinging the mounting means so that the aspherics swings within a predetermined angle about the axis of rotation, there is provided means for continuously detecting the angle of swing of the aspherics, slidable means displaceable in a direction orthogonal to the axis of rotation, fine displacement detecting means having a detecting head making a point-contact with the aspherics, the detecting means being disposed between the aspherics and the slidable means for detecting any variation in the distance between the point of contact and the slidable means, drive means for displacing the slidable means, the amount of drive of the drive means being determined in accordance with an input signal thereto, control means coupled to the angle-of-swing detecting means for pre-memorizing the amount of separation from the approximately tangential spherical plane at each point on the aspherics and for generating a signal to the drive means so as to displace the slidable means by an amount equal to the memorized amount of separation at the point of contact with the detecting head corresponding to the detected angle of swing, and means for displaying the variation in the distance detected by the fine displacement detecting means.

9 Claims, 2 Drawing Figures

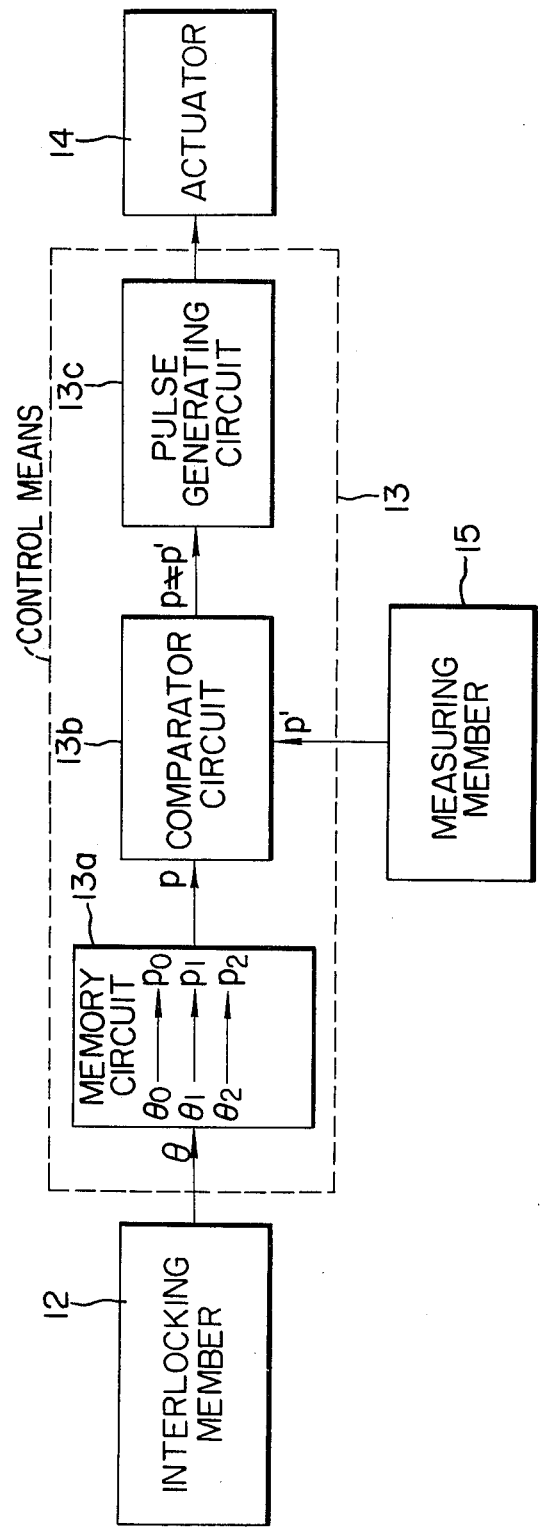

DEVICE FOR MEASURING AXIALLY SYMMETRIC ASPHERICS

BACKGROUND OF THE INVENTION

1. Field of the Invention

This invention relates to a device for measuring the surface configuration of axially symmetric aspherics.

2. Description of the Prior Art

In the prior art devices for measuring axially symmetric aspherics such as aspheric lenses or the like, a member holding a sample lens has been swung through a predetermined angle of rotation about an axis orthogonal to the optic axis of the lens to thereby detect the angle of rotation and a carriage holding a stylus engaged with the sample lens has been provided for sliding movement along the optic axis and such carriage has been displaced by the point of contact of the sample lens with the stylus being displaced along the optic axis during the swinging movement of the sample lens, whereby the surface characteristic of the aspheric lens has been obtained from the amount of such displacement and the aforementioned angle of rotation. However, such prior art devices have required the surface of the sample lens to be always in contact with the stylus and if the bias force for establishing such contact was weak, an error of measurement might be caused and if the bias force was too strong, the stylus might damage the lens surface.

SUMMARY OF THE INVENTION

It is an object of the present invention to provide a device for measuring axially symmetric aspherics without damaging the same.

It is another object of the present invention to provide such a device in which measurement errors are minimized.

The device of the present invention comprises means for swinging axially symmetric aspherics to be measured within a predetermined angle about an axis of rotation orthogonal to the axis of symmetry of the aspherics and passing through the center of curvature of the approximately tangential spherical plane of the aspherics, means for continuously detecting the angle of the aspherics, slidable means displaceable in a direction orthogonal to the axis of rotation, fine displacement detecting means having a detecting head making a point-contact with the aspherics, the detecting means being disposed between the aspherics and the slidable means for detecting any variation in the distance between the point of contact and the slidable means, drive means for displacing the slidable means, the amount of drive of the drive means being determined in accordance with an input signal thereto, control means coupled to the angle-of-swing detecting means for pre-memorizing the amount of separation from the approximately tangential spherical plane at each point on the aspherics and for generating a signal to the drive means so as to displace the slidable means by an amount equal to the memorized amount of separation at the point of contact with the detecting head corresponding to the detected angle of swing, and means for displaying the variation in the distance detected by the fine displacement detecting means.

Thus, according to the present invention, the aspherics to be measured itself does not slide the carriage of great mass, so that the aspherics is free from any extraneous force which will damage the surface configuration thereof.

The invention will become fully apparent from the following detailed description thereof taken in conjunction with the accompanying drawings.

BRIEF DESCRIPTION OF THE DRAWINGS

FIG. 2 is a block diagram of a control mechanism in the device of the present invention.

DESCRIPTION OF THE PREFERRED EMBODIMENTS

Figure 1:
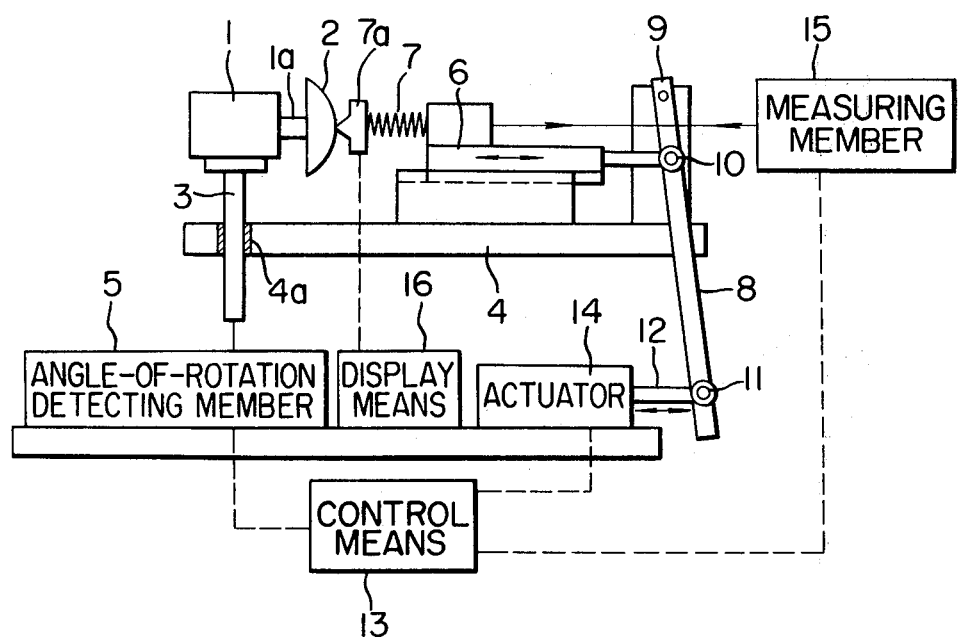
FIG. 1 is a schematic side view of an embodiment of the present invention.

Description will hereinafter be made of an embodiment of the present invention for measuring axially symmetric aspherics. In FIG. 1, a sample mounting member 1 has a mounting portion 1a of variable length formed at one end for mounting thereon a sample lens 2 to be measured. A center shaft 3 orthogonal to the optic axis of the sample lens 2 has the sample mounting member 1 secured to one end thereof and is rotatably mounted to a device body 4 through a sleeve 4a. The center shaft 3 is reciprocally rotatably within a predetermined angle of rotation by a drive source, not shown, and also swingable within the range of engagement between the sample lens 2 and the head 7a of a roughness detecting member 7 which will further be described. An angle-of-rotation detecting member 5 such as rotary encoder or the like is designed to detect the angle of rotation of the center shaft 3 at all times. A carriage 6 is slidable in the same direction as the optic axis (the direction of double-headed arrow) with respect to the referential swing position of the sample lens. The roughness detecting member 7 such as electric micrometer or the like is secured to the carriage 6 and has at one end thereof the head 7a normally biased for engagement with the sample lens, so that it may detect any fine variation in the distance between that engaged end and the carriage. The engaged end is designed to pass on the optic axis during swinging of the sample lens 2 without fail. A reducing lever 8 is pivotally mounted at one end on the device body 4 by means of a pivot pin 9 and rotatably supports at an intermediate portion thereof a rotatable roller 10 engaged with one end of the carriage 6, and rotatably supports at the other end a roller 11 engaged with an interlocking member 12 slidable in the direction of double-headed arrow in response to movement of an actuator 14 which will further be described. The reducing lever 8, pivot pin 9, rollers 10 and 11 together constitute reducing means for reducing the amount of displacement imparted by the actuator 14 and for transmitting such reduced amount of displacement to the carriage 6.

The actuator 14 may be driven by a pulse motor and may receive pulse signals from control means 13, which will further be described, and impart rectilinear reciprocal movement to the aforementioned interlocking member 12. A measuring member 15 such as laser interference measuring device is provided to measure the amount of displacement of the carriage 6 at all times and also to transmit the measured data to the control means 13.

The control means 13 may be a computer or the like and, as shown in FIG. 2, comprises a memory circuit 13a connected to the angle-of-rotation detecting member 5, a comparator circuit 13b connected to the memory circuit and to the measuring member 15, and a pulse generating circuit 13c connected to the comparator circuit. The control means 13 is connected to the actuator 14.

In accordance with the angles of rotation $\theta_0, \theta_1, \theta_2, \ldots$ of the center shaft 3, the memory circuit 13a pre-memorizes the amounts of separation $l_0, l_1, l_2, \ldots$ from the approximately tangential spherical plane (spherical plane tangential with the aspheric surface on the axis of symmetry) at various points on the predetermined aspheric surface of the sample lens 2 which is supposed to have such predetermined (calculative) aspheric surface configuration, and when a data relating to the angle of rotation $\theta$ is transmitted thereto from the angle-of-rotation detecting member 5, the memory circuit sends to the comparator circuit 13b the information on the amount of separation l corresponding to said data.

The comparator circuit 13b compares the amount of separation l sent from the memory circuit 13a with the amount of displacement l' of the carriage transmitted from the measuring member 15 and, whenever there is a difference between the two amounts, the comparator circuit sends to the pulse generating circuit 13c an electrical signal having a value corresponding to the difference.

The pulse generating circuit 13c generates the number of pulse signals corresponding to the amount of the electrical signal sent from the comparator circuit 13b.

Designated by 16 is display means for displaying the amount of fine displacement detected by the roughness detecting member 7.

With such a construction, measurement of the axially symmetric aspheric surface of an aspheric lens or the like may be accomplished by mounting a sample lens on the mounting member 1, adjusting the length of the mounting portion 1a so as to coincide the center shaft 3 with the center of curvature of the approximately tangential spherical plane of the sample lens, swinging the sample mounting member 1 with the sample lens 2 through a predetermined angle of rotation about the center shaft 3, continuously measuring the angle of rotation during the swinging by means of the angle-of-rotation detecting member 5, and transmitting the detected data to the control means 13. In accordance with such data, the control means 13 generates pulse signals corresponding to the angles of rotation of the center shaft 3 prememorized therein, and operates the actuator 14 to displace the carriage 6 in the direction of arrow through the agency of the reducing means 8-11. At the same time, the amount of displacement of the carriage 6 is at all times measured by the measuring member 15 and fed back to the control means 13, which in turn compares the amount measured by the measuring member 15 with the aforementioned memorized amount and, whenever there is a difference therebetween, corrects the operation of the actuator 14. The roughness detecting member 7 detects variations in the distance from the engaged end of the head 7a, which is always in contact with the sample lens 2, to the carriage 6, and transmits the detected data to the display means 16, which thus displays the data. Accordingly, if the sample lens has a predetermined aspheric surface configuration, the carriage 6 accurately slides so as to always maintain constant the distance from the engaged end of the head 7a to the carriage 6, so that if the sample lens is an aspheric lens having an error with respect to the predetermined configuration, said distance will be varied with the swinging of the lens and detected by the roughness detecting member 7.

In the embodiment shown in FIG. 1, the invention has been described with respect to a device for measuring axially symmetric convex aspherics, whereas the invention may also be embodied in a device for measuring axially symmetric concave aspherics on the same prinicple.

Also, the control means 13 may alternatively be formed without the comparator circuit 13b and designed such that the distance l sent from the memory circuit 13a is directly applied to the pulse generating circuit 13c and the number of pulses corresponding to the amount of separation l is transmitted to the actuator 14 which in turn transmits a displacement corresponding to said pulse number to the carriage 6 through the reducing means, and the measuring member 15 may be eliminated.

In such case, if the amount of error produced by the actuator 14 and the reducing means is negligible, the object of the present invention may be fully achieved even by such a device.

The display means 16 may be incorporated in the control means 13 by using as the control means 13 a computer having a display function.

What I claimed is:

1. A device for measuring axially symmetric aspherics comprising:
    (a) means for mounting the aspherics thereon;
    (b) means having an axis of rotation orthogonal to the axis of symmetry of said aspherics and passing through the center of curvature of the approximately tangential spherical plane of said aspherics, said means being for swinging said mounting means so that said aspherics swings within a predetermined angle about said axis of rotation;
    (c) means for continuously detecting the angle of swing of said aspherics;
    (d) slidable means displaceable in a direction orthogonal to said axis of rotation;
    (e) fine displacement detecting means having a detecting head making a point-contact with said aspherics, said detecting means being disposed between said aspherics and said slidable means for detecting any variation in the distance between said point of contact and said slidable means;
    (f) drive means for displacing said slidable means, the amount of drive of said drive means being determined in accordance with an input signal thereto;
    (g) control means coupled to said angle-of-swing detecting means for pre-memorizing the amount of separation from the approximately tangential spherical plane at each point on said aspherics and for generating a signal to said drive means so as to displace said slidable means by an amount equal to the memorized amount of separation at the point of contact with said detecting head corresponding to the detected angle of swing; and
    (h) means for displaying the variation in the distance detected by said fine displacement detecting means.

2. A device according to claim 1, wherein said detecting head is disposed at a location which crosses said axis of symmetry when said aspherics swings.

3. A device according to claim 2, wherein said fine displacement detecting means converts the detected variation in the distance into an electrical signal and transmits such signal to said display means.

4. A device according to claim 1, further comprising means for continuously measuring the amount of displacement of said slidable means, said measuring means being coupled to said control means, and said control means controlling said drive means so that the measured amount of displacement is equal to said memorized amount of separation.

5. A device according to claim 4, wherein said control means includes:
   memory means;
   means for comparing said measured amount of displacement with said amount of separation momorized by said memory means; and
   means for generating a signal for operating said drive means when there is a difference between said two amounts compared.

6. A device according to claim 5, wherein said drive means includes:
   a drive member for receiving the signal from said control means and causing a displacement in accordance with said signal; and
   reducing means disposed between said drive member and said slidable means so as to reduce the displacement caused by said drive member and to transmit the reduced displacement to said slidable means.

7. A device according to claim 6, wherein said drive member has a pulse motor operable in response to a pulse signal and in accordance with the amount of said pulse.

8. A device according to claim 1, wherein said mounting means has means for securing said aspherics at any desired position with respect to the axis of rotation of said swinging means in accordance with the magnitude of the curvature radius of the approximately tangential spherical plane of said aspherics.

9. A device according to claim 3, wherein said fine displacement detecting means is an electric micrometer secured to said slidable means.

* * * * *